United States Patent [19]
Craze

[11] Patent Number: 5,483,801
[45] Date of Patent: Jan. 16, 1996

[54] PROCESS FOR EXTRACTING VAPOR FROM A GAS STREAM

[75] Inventor: David J. Craze, Yokohama, Japan

[73] Assignee: Ezarc Pty., Ltd., Nedlands, Australia

[21] Appl. No.: 302,678

[22] PCT Filed: Feb. 16, 1993

[86] PCT No.: PCT/US93/01808

§ 371 Date: Nov. 21, 1994

§ 102(e) Date: Nov. 21, 1994

[87] PCT Pub. No.: WO93/16338

PCT Pub. Date: Aug. 19, 1993

[30] Foreign Application Priority Data

Feb. 17, 1992 [AU] Australia .................................. PL 0905

[51] Int. Cl.⁶ ............................................. F25B 9/02
[52] U.S. Cl. ............................................. 62/5; 62/11
[58] Field of Search ................................... 62/5, 11

[56] References Cited

U.S. PATENT DOCUMENTS 3,775,988 12/1973 Fekete ............................................. 62/5
4,093,427 6/1978 Schlenker ....................................... 62/5
4,247,794 3/1981 Shirokow et al. .............................. 62/5
4,531,371 7/1985 Voronin et al. ................................. 62/5
4,584,838 4/1986 Ajujudom, III ................................ 62/5
5,246,575 9/1993 Alexander ....................................... 62/5
5,305,610 4/1994 Bennett et al. ................................. 62/5

*Primary Examiner*—Ronald C. Capossela
*Attorney, Agent, or Firm*—Sroufe, Payne & Lundeen

[57] ABSTRACT

A high efficiency process and apparatus for extracting condensable vapors from a gas stream using a vortex tube expansion. The process comprises partially condensing a raw feed high pressure gas stream rich in condensable vapor in a high pressure condenser by an exchange of heat with a cooling medium comprising a cold exhaust stream from a vortex tube; separating condensate from the raw gas stream in a separator to produce a raw lean gas stream; expanding the raw lean gas stream in the vortex tube to produce the cold exhaust stream and a hot exhaust stream; and preferably ejecting the cold exhaust stream with the hot exhaust stream in an ejector to increase pressure differential through the vortex tube.

30 Claims, 4 Drawing Sheets

PROCESS FOR EXTRACTING VAPOR FROM A GAS STREAM

FILED OF THE INVENTION

The present invention relates to a process for extracting vapor components from a multi-component gas stream using a vortex tube.

BACKGROUND OF THE INVENTION

Although vortex tubes are well known in the art, such devices have not gained wide acceptance due to a limited understanding of the thermodynamic principles involved. As a result few practitioners have studied the features of gas behavior in a vortex tube or adapted use of the vortex tube into gas separation technology.

First observed in the 1930's, the vortex tube is responsible for the so-called Ranque effect wherein a gas at higher pressure which is throttled in a centrifugal field set up in a tube will separate into two outlet streams: one which is cooler and one which is hotter than the temperature of the gas feed. In a vortex tube, the gas stream is fed tangentially to the tube wall and expanded in the tube. The vortex thus formed creates an intense centrifugal field within which gas dynamic transport processes and to a lesser extent Joule-Thomson (JT) cooling establish temperature, pressure and compositional gradients in the tube both axially and radially. The net result is that the vortex core which becomes cooled flows in the opposite direction to the vortex periphery which becomes heated. The coolest gas occurs at the end of the tube in the cool flow direction and the hottest gas occurs at the end of the tube in the hot flow direction. Vapor components of the feed gas, if close to their dew point, initially condense in the core and are flung to the periphery by centrifugal action. However, condensate thus formed becomes heated and re-vaporized. The fraction of the peripheral stream which does not exit the hot end migrates back to the core and gets re-condensed as it flows in the cool direction. This condensate is then generally flung back to the peripheral stream before it can exit the cold end. As a result, condensate vapors entering the vortex tube with the feed are concentrated in and mostly discharged with the hot stream, and the cold stream exhausts as an essentially dry, saturated stream.

Fulton U.S. Pat. Nos. 3,173,273 and 3,208,229, the disclosures of which are hereby incorporated herein by reference, describes basic designs for most efficient vortex tube operation. The characteristic performance curve for a typical vortex tube as described by Fulton having the hot side insulated and operating under ideal gas conditions, where the Joule-Thomson cooling effect is negligible, is shown in FIG. 1, which is a graph of the hot side and cold side outlet stream temperature change ($\Delta T_h$–$\Delta T_c$) with respect to the feed temperature ($T_f$) versus the fraction of the feed stream ($\chi_c$) which exits the tube through the cold end. Typically, the maximum temperature drop in the cold stream is about 50 percent of an adiabatic temperature drop occurring for the same pressure drop at the cold outlet. This generally occurs at a cold fraction of 0.4 or less. In terms of temperature differential alone between the hot and cold streams ($\Delta T_h$–$\Delta T_c$), however, this differential is about 83 percent of the adiabatic temperature drop. As a greater fraction is withdrawn from the cold end up to about 75 percent optimally, the temperature drop in the cold stream alone becomes lower (about 30% at $\chi_c$=0.75) but the temperature spread ($\Delta T_h$–$\Delta T_c$) increases to about 120 percent of the adiabatic temperature drop for the corresponding pressure drop at the cold outlet. Under real gas conditions, for example at high pressures or low temperatures, the overall cooling experienced in a vortex tube is even larger because the Joule-Thomson cooling effect is superimposed over the Ranque effect.

Advantageous features of a vortex tube are an absence of moving parts and reduced utility requirements in comparison with an expansion turbine, for example.

The cooling effect of a vortex tube has been used in the past to recover liquids from gas streams. Fekete U.S. Pat. No. 3,775,988 describes the use of cold flow vortex tube expansion principles in liquefaction and cold-producing processes wherein the vortex tube substitutes for an expansion turbine. Fekete U.S. Pat. No. 4,458,494 describes the use of an improved vortex tube in a gas-liquid separation process wherein vaporization of the liquid in the peripheral stream of the tube is retarded by either cooling a short section of the periphery with a tube cooling jacket or by taking the liquid out at a short distance from the tube inlet, where the heating effect is minimal, and insulating the liquid from the heating effect.

Shirokov et al. U.S. Pat. No. 4,185,977 describes a process of separating hydrocarbon from gaseous mixtures to produce hydrogen. The process resides in cooling a gas mixture comprising hydrogen, methane and olefins in heat exchangers by stages with the resulting liquid condensate being separated at each stage. The products obtained are a liquid condensate of olefins, liquid methane/hydrogen, and an enriched hydrogen vapor stream. The liquid methane condensate with an admixture of hydrogen is evaporated and expanded with the use of a vortex effect. The resulting cold and hot streams are fed separately to the heat exchangers as a heating or cooling medium. The hydrogen-rich vapor portion is also expanded with the use of a vortex effect to give a cold stream consisting of pure hydrogen whereupon the cold and hot streams are fed separately to heat exchangers each having an appropriate temperature.

Shirokov et al. U.S. Pat. No. 4,257,794 describes a process of separating a gaseous hydrocarbon mixture of methane, olefins and hydrogen residing in cooling the mixture by stages with the resulting liquid condensate of olefins and methane being withdrawn at each stage, recovering a gaseous hydrogen-methane mixture with some mixed ethylene produced by demethanization in a demethanizer column and further cooling the same. The resulting condensate thus withdrawn is adapted for use as a spraying means in the demethanization. The remaining gaseous methane-hydrogen mixture is expanded with application of a vortex effect to produce hot and cold streams. The hot and cold streams are mixed, with the cold stream having first passed countercurrently against the methane-hydrogen-ethylene mixture, and again expanded with application of a vortex effect. The resulting hot stream is fed countercurrently against the hydrocarbon stream being separated and the cold stream countercurrently against the methane-hydrogen-ethylene mixture.

Kosenkov et al. Russian patent publication SU1160211-A describes a hydrocarbon cooling method including the throttling of a liquid stream from a vortex pipe which stream is used for cooling the vortex pipe hot end.

Heat exchanger equipment having a high thermal effectiveness coefficient are described in W. M. Kays and A. L. London, *Compact Heat Exchangers*, 3rd ed. 1984, New York:McGraw Hill; and D. Chisolm (Ed), *Developments in Heat Exchanger Technology*-1, Applied Science Publications, 1980, Chapter 5, Usher et al., "Compact Heat Exchangers" which are hereby incorporated herein by reference.

Other references of interest include Atkinson U.S. Pat. No. 2,683,972 and Fekete, *The Oil and Gas Journal*, Jun. 15, 1970, pp. 71–73.

The cooling effect of the vortex tube has generally been utilized in combination with heat exchangers of low thermal efficiency and has been confined to relatively high pressure applications. It is well known that a minimum pressure ratio for the expansion is necessary to achieve the effect desired in a vortex tube and that increasing the expansion pressure drop enhances the cooling obtained. There are however, many low pressure gas streams containing condensable vapors such as flared waste gas streams and exhaust fumes from sulfide ore smelters where the JT cooling effect is negligible, economic value of the gas stream is low in relation to the cost of compressor equipment and the use of expanders is impractical. It would be advantageous to be able to recover valuable liquids, (e.g., hydrocarbons) from these streams as well.

SUMMARY OF THE INVENTION

The liquid extraction process of the present invention incorporates high efficiency heat exchangers with vortex expansion to enhance the performance of a vortex tube for condensing vapors in a feed stream. As a result of the improvement, less economic lower pressure gas streams can be treated in the present process to recover hydrocarbon feed components otherwise burned.

In one embodiment, the present invention comprises a process for extracting vapor from a gas stream. As one step, a raw high pressure gas stream rich in condensable vapor is partially condensed by an exchange of heat with a cooling medium comprising a cold exhaust stream from a vortex tube. As another step, condensate is separated from the raw gas stream to produce a raw lean gas stream. The raw lean gas stream is expanded in the vortex tube to produce the cold exhaust stream and a hot exhaust stream. The cold exhaust stream is ejected with the hot exhaust stream in an ejector to give a mixed vortex tube exhaust stream and increase the pressure differential through the vortex tube. While ejection is a particularly preferred means for mixing the cold and hot exhaust streams, any mixing means can be used.

In a preferred embodiment, a recirculating flow in the vortex tube is cooled by an exchange of heat with the cold exhaust stream. The hot exhaust stream is partially condensed by an exchange of heat with the mixed vortex tube exhaust stream. Alternatively, the hot exhaust stream is partially condensed by an exchange of heat with the cold exhaust stream prior to the cold and hot exhaust stream mixing step. The partially condensed hot exhaust stream is optionally mixed with the condensate separated from the raw feed stream to form a mixed condensate-containing hot exhaust stream. Condensate is separated from the mixed condensate hot exhaust stream to form a mixed liquid stream and a lean hot exhaust stream. The recirculation flow in the vortex tube is optionally further cooled by an exchange of heat with a liquid cooling medium comprising the mixed liquid stream, wherein the mixed liquid stream remains substantially liquid.

When necessary, the condensate liquid can be stripped of any volatile components which can re-vaporize in any cooling step employing a liquid cooling medium. In which case, the mixed liquid stream rich in volatiles is fed to a stripping column prior to the step of liquid cooling the recirculation flow in the vortex tube. Volatiles are stripped from the mixed liquid stream to produce a volatiles-rich overhead and a volatiles-lean liquid bottoms. The column is heated by an exchange of heat with the raw high pressure stream prior to the raw stream partial condensing step. The rich gas overhead is mixed with the lean hot exhaust stream, whereas the lean liquid bottoms comprises the liquid cooling medium in the liquid cooling step. In an alternative arrangement, the column is heated by an exchange of heat with the hot exhaust stream prior to the hot exhaust stream partial condensing step.

Depending on the composition and condition of the raw gas stream, the hot exhaust stream can be precooled by an exchange of heat with the mixed exhaust stream prior to the hot exhaust stream partial condensing step. The hot exhaust stream can be further precooled prior to the hot exhaust stream partial condensing step by an exchange of heat with the liquid cooling medium. The cold exhaust stream comprises 50 percent or more, preferably 60 to about 80 percent of the raw lean gas stream.

In another embodiment, the present invention provides an apparatus for extracting vapor from a gas stream. The apparatus comprises a high pressure partial condenser for condensing condensable vapor from raw high pressure gas stream using a cold exhaust stream as a cooling medium and a high pressure liquid-gas separator for separating condensate from the raw gas stream. A vortex tube expands a lean raw gas stream from the high pressure separator to produce the cold exhaust stream and a hot exhaust stream. An ejector is preferably used for mixing the hot and cold exhaust streams and increasing the pressure differential through the vortex tube, however, any kind of mixer can be used.

In a preferred embodiment, the apparatus comprises a first vortex tube heat exchanger integrally attached at a hot exhaust discharge end of the vortex tube for cooling a recirculation flow in the vortex tube using the cold exhaust stream as cooling medium. A low pressure partial condenser is preferably disposed downstream of the vortex tube for partially condensing condensable vapor in the hot exhaust stream having the mixed exhaust stream as cooling medium. A line from the low pressure partial condenser optionally mixes the partially condensed hot exhaust stream with the condensate separated from the raw high pressure stream to form a mixed condensate hot exhaust stream. A low pressure separator separates condensate from the condensate-containing hot exhaust stream to form a mixed liquid stream and a lean hot exhaust stream. An optional second vortex tube heat exchanger integrally attached to the hot exhaust discharge end of the vortex tube further cools the recirculation in the vortex tube by employing the mixed liquid stream as cooling medium, wherein the mixed liquid stream remains substantially liquid.

When necessary, the apparatus can use a stripper to remove volatile components from the liquid stream cooling medium which can become re-vaporized in any liquid cooled heat exchanger. Therefore, a stripping column can be disposed upstream of the second vortex tube exchanger and have a reflux reboiler for stripping volatiles from the volatiles-rich mixed liquid stream to produce a volatiles-rich gas overhead stream and a volatiles-lean liquid bottoms stream. A line from the low pressure liquid-gas separator directs the volatiles-rich mixed liquid stream to the stripping column. An overhead line from the stripper mixes the rich overhead stream with the lean hot exhaust stream from the low pressure liquid-gas separator. A bottoms line from the stripper directs the lean liquid stream as cooling medium to the second vortex heat exchanger. A feed line directs the raw high pressure gas prior to the raw stream partial condenser to the reflux reboiler as heating medium. Alternatively, the reboiler is disposed upstream of the high pressure partial condenser and employs the hot exhaust stream as heating medium.

Depending on the composition and condition of the raw gas stream, the apparatus can use one or more gas and/or liquid cooled precoolers upstream of the low pressure partial condenser and/or liquid cooled vortex exchanger for precooling the hot exhaust stream. The cooling medium can be mixed exhaust stream and/or a suitably lean liquid stream. Alternatively, the gas cooled precooler can be disposed upstream of the mixer or ejector and can use the cold exhaust stream as cooling medium. The cold exhaust stream comprises 50 percent or more, but preferably about 60 to about 80 percent of the raw lean gas stream.

DETAILED DESCRIPTION OF THE INVENTION

Figure 1:
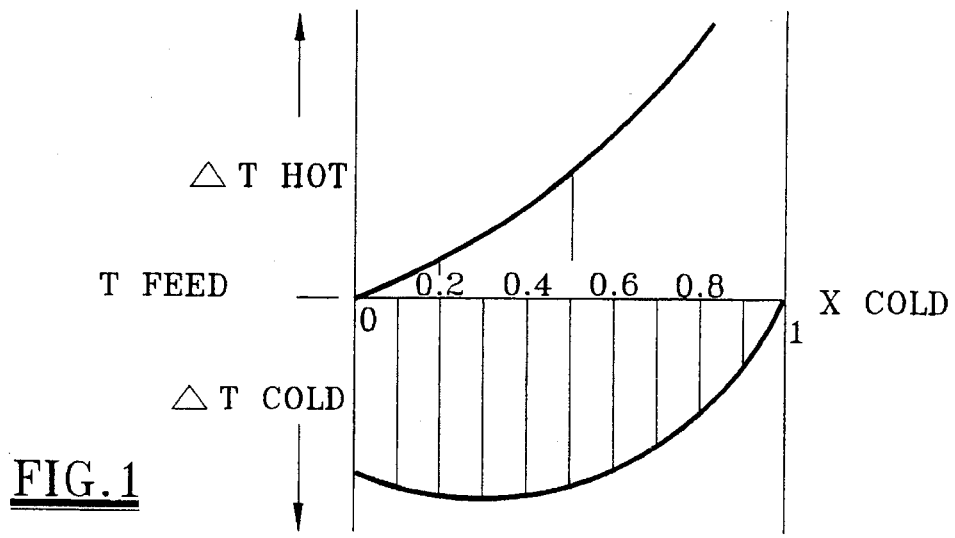
FIG. 1 is a graph of a temperature difference of vortex tube feed and exhaust stream temperature versus the fraction of the stream taken off as the cold exhaust stream ($\Delta T_{hot}=\{T_{hot}-T_{feed}\}$, $\Delta T_{cold}=\{T_{cold}-T_{feed}\}$ vs. $\chi_{cold}$) showing a representation of vortex tube expansion behavior for a representative gas stream.
Figure 2:
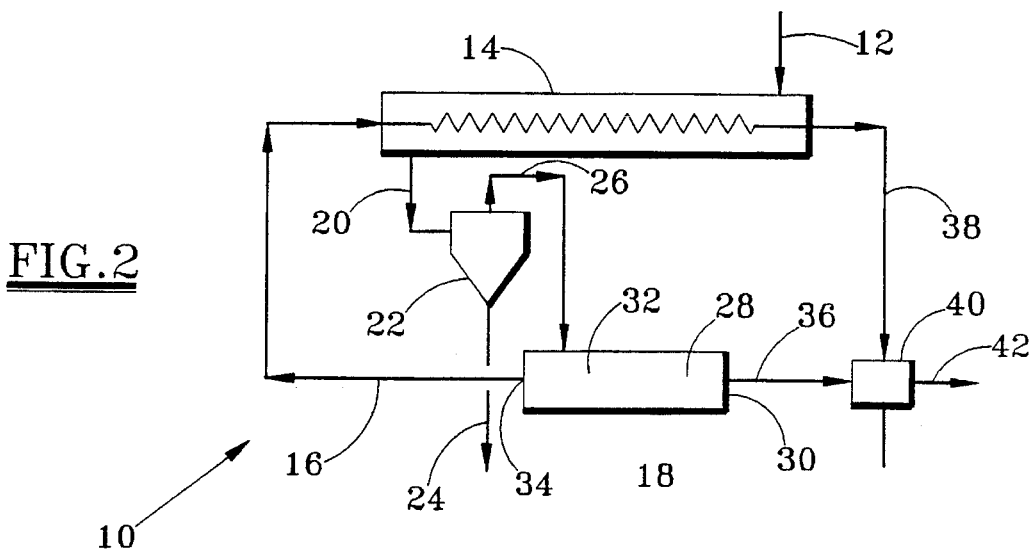
FIG. 2 is one embodiment of the present process showing a vortex tube for expanding a feed gas to produce a cold exhaust stream, a high pressure partial condenser for condensing condensables from the feed stream using the cold exhaust stream as cooling medium, a high pressure liquid-gas separator for separating the condensate and an ejector for mixing the hot and cold exhaust streams and increasing the pressure ratio through the vortex tube.

A vortex tube expansion in conjunction with high thermal efficiency heat exchangers are used to enrich and condense condensable vapors from a gas stream such as natural gas. In the vortex tube, a separation effect due to gas dynamic phenomena enriches a hot exhaust stream. A temperature differential between the hot exhaust stream and a cold exhaust stream due to pressure expansion can be used to partially condense the hot exhaust stream. An ejector can be used to increase the pressure differential through the vortex tube for enhanced results. The present process efficiently takes advantage of vortex tube behavior to eliminate the need for equipment having moving parts such as an turbine expander in an ordinary gas separation/vapor extraction process.

The basis for the present invention is: (1) to precool the feed gas stream prior to admission to the vortex tube using the vortex tube cold exhaust stream as cooling medium; (2) to cool a vortex tube hot exhaust stream externally using the cold exhaust stream as cooling medium; (3) to cool the re-circulating flow within the vortex tube directly and the hot exhaust stream indirectly using the cold exhaust stream as cooling medium; and (4) to preferably eject the cold or hot exhaust stream using the other exhaust stream as carrier. High thermal efficiency heat exchangers are preferably used to cope with close temperature approaches. To cool the recirculating flow, cooling is preferably applied directly to the vortex tube walls itself by integrating one or more high thermal efficiency heat exchangers into the vortex tube construction.

By definition, "cold exhaust stream" refers to a stream originating at a cold exhaust discharge port of the vortex tube and "hot exhaust stream" refers to a stream originating at a hot exhaust discharge port of the vortex tube. A "mixed exhaust stream" is a stream comprising a mixture of a least a portion of the cold and hot exhaust streams. However, a mixed stream comprising, for example, a hot exhaust stream and a portion of the raw feed gas but none of the cold exhaust stream is still defined as a "hot exhaust stream." The terms "thermal effectiveness" or "thermal effectiveness coefficient" are adopted from Kays et al. to refer to exchanger heat transfer effectiveness. Thermal effectiveness is defined as the ratio between the actual heat transferred and the maximum amount of heat transfer which is theoretically possible.

Referring to FIGS. 2–9 wherein like referenced numerals refer to like parts, a pressurized and dehydrated raw feed gas such as natural gas from a gas field production, for example, containing condensable vapors such as $c_{2+}$ is fed in line 12 to a high pressure feed partial condenser 14 of the present vapor extraction process 10 of the present invention. In the partial condenser 14, condensable vapor components are at least partially condensed from the raw gas by an exchange of heat with a cooling medium in line 16 comprising a cold exhaust stream produced by a vortex expansion in a vortex tube 18. A partially condensed effluent from the partial condenser 14 is fed through line 20 to a high pressure separator 22 such as, for example, a cyclone, filter, drum or other impingement knockout device. In the high pressure separator 22, condensate separated from an uncondensed portion of the raw feed stream is removed through line 24 for storage or further processing. The uncondensed portion of the raw feed comprising uncondensed vapor and gas is fed through line 26 to the vortex tube 18. In the vortex tube 18, the higher pressure raw feed is conventionally throttled to a lower pressure in a vortex expansion. Although not shown, the raw feed stream is fed to the vortex tube 18 using a tangential nozzle as known in the art. Other conventional vortex tube internal components (not shown) include an orifice, associated ducts, plenum, diffuser, generator, torque brake, and the like described, for example, in Fulton and/or Fekete.

The vortex tube 18 has a warming section 28 terminating in a hot exhaust discharge port 30 and a cooling section 32 terminating in a cold exhaust discharge port 34. A lower pressure hot stream exhausts from the vortex tube hot discharge port 30 through a line 36 and a lower pressure cold stream exhausts from the vortex tube cold discharge port 34 through line 16. In addition to lower pressure, the hot exhaust stream in line 36 typically has a higher temperature than the raw feed stream in line 26 and is enriched with the condensable vapor components of the raw feed stream. Besides a lower pressure, which is substantially lower than that of the hot exhaust stream in line 36, the cold exhaust stream in line 16 typically has a cooler temperature than the raw feed stream in line 26 and is leaner in condensable vapor components than the raw feed stream. The cold exhaust stream in line 16 typically comprises at least 50 percent of the feed stream in line 26 but preferably from about 60 to about 80 percent of the feed stream in line 26.

The cold exhaust stream, used as cooling medium in the partial condenser 14 as described above, is fed through line 38 to an ejector 40. In the ejector 40, the cold exhaust stream in line 38 is ejected by the hot exhaust stream in line 36 and mixed thereby. A mixed stream comprising the cold and hot exhaust streams is removed through line 42. The ejector 40 is preferably used to lower the pressure of the ejected stream (in this case the cold exhaust stream) to increase the pressure ratio through the vortex tube for enhanced efficiency. The mixed stream in line 42, if the system is well insulated, should have an increased enthalpy above that of the feed stream in line 26 equivalent to the enthalpy change of the condensed vapors which are removed as liquid in line 24.

The actual conditions and composition of the cold and hot exhaust streams in lines 16, 36 will depend on many factors including the condition and composition of the raw gas feed; pressure ratio through the vortex tube (of the expansion); cooling applied to the vortex tube itself, the feed stream and the cold and hot exhaust streams (subsequently described hereinbelow); design of the vortex tube; and the like.

Figure 3:
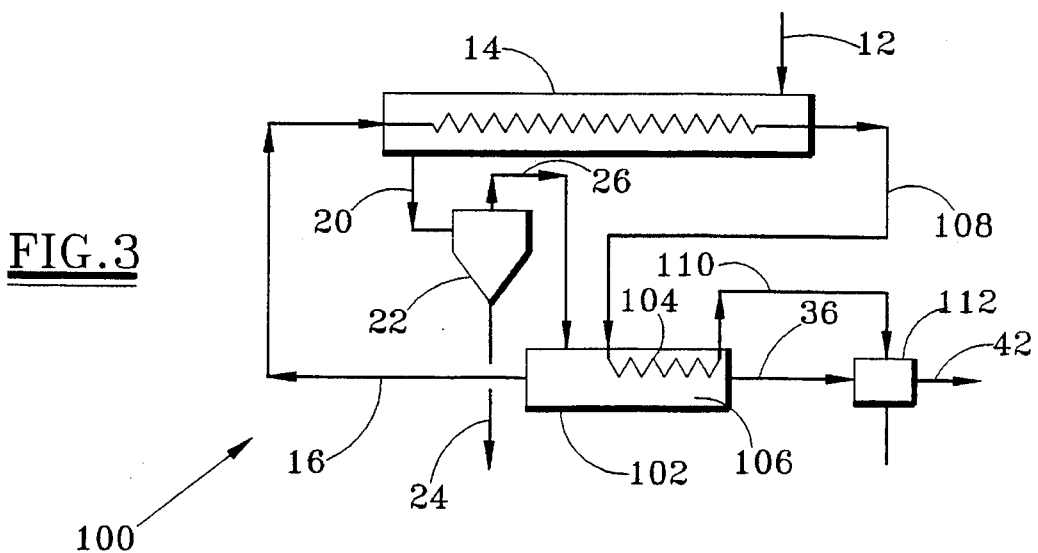
FIG. 3 is another embodiment of the process of FIG. 2 showing a vortex tube heat exchanger integrally attached to a hot discharge end of the vortex tube cooling a recirculation flow in the vortex tube using the cold exhaust stream as cooling medium.

As seen in FIG. 3 in an alternative arrangement 100 of the present extraction process, cooling can be applied directly to a vortex tube 102 having a heat exchanger 104 which is integrated into the vortex tube wall at a warming section 106 wherein a recirculation flow gets progressively warmer than the feed temperature. In the vortex tube heat exchanger 104, the recirculation flow of the vortex tube is cooled by an exchange of heat with the cold exhaust stream (which is substantially in a gas state) fed through line 108. Use of the gas cooled vortex tube heat exchanger 104 has dynamic effects throughout the process 100. By cooling the vortex tube recirculation flow, both the cold and hot exhaust streams in lines 16, 36 are indirectly lowered. Greater cooling enhances vapor extraction in the partial condenser 14 which in turn effects the stream composition of the vortex tube feed in line 26 and the dynamics in the vortex tube 102, etc. The cold exhaust stream (gas) leaving the vortex tube exchanger 104 is fed through line 110 to a mixer 112 wherein the cold exhaust stream in line 110 is mixed with the hot exhaust stream in line 36 to give the mixed exhaust stream in line 42 as previously mentioned. While any suitable mixing device can be used, the mixer 112 is preferably an ejector.

Figure 4:
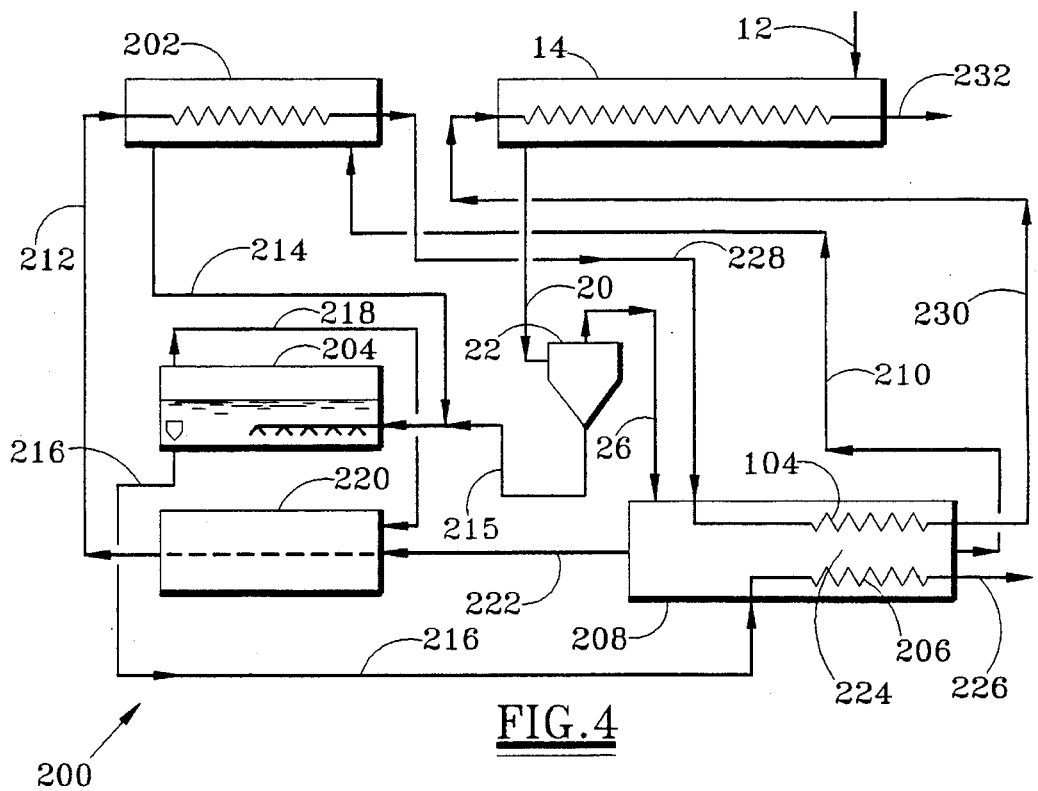
FIG. 4 is another embodiment of the process of FIG. 3 showing another vortex tube heat exchanger integral to the hot discharge end of the vortex tube using the condensate as the cooling medium, a low pressure partial condenser for partially condensing condensables in the hot exhaust gas wherein the ejector stream is used as cooling medium and a low pressure liquid-gas separator for separating condensate from the partially condensed hot exhaust stream.

As seen in FIG. 4, an alternative arrangement 200 of the present process cools the hot exhaust stream in a low pressure partial condenser 202 to at least partially condense any condensable vapors in the hot exhaust stream. The cold condensate which is produced from the raw feed stream and the hot exhaust stream, is effectively cooled to or subcooled below its saturation temperature, and can be utilized to further promote condensation of the vapors through heat exchange against the raw feed stream, hot exhaust stream and/or the vortex tube. A low pressure separator 204 separates additional condensate from the uncondensed portion of the hot exhaust gas. Another feature includes an optional liquid cooled vortex tube heat exchanger 206 adjacent the gas cooled vortex tube heat exchanger 104 in a vortex tube 208.

The hot exhaust stream is removed from the vortex tube 208 through line 210 and directed to the low pressure partial condenser 202. In the low pressure partial condenser 202, an exchange of heat against a cooling medium in line 212 at least partially condenses condensable vapors from the hot exhaust stream in line 210. A partially condensed stream thus formed is removed through line 214 to the low pressure separator 204 and optionally combined with the raw feed stream condensate from the high pressure separator 22 in line 215. In the low pressure separator 204, condensate is separated from the uncondensed vapor and gas portion of the hot exhaust stream and the combined condensate from both the raw feed stream and the hot exhaust stream is removed in a line 216 as a liquid cooling medium in the liquid cooled vortex tube heat exchanger 206. The uncondensed vapor and gas portion of the hot exhaust stream is removed from the low pressure separator though line 218 and fed to an ejector 220. In the ejector 220, the cold exhaust stream in line 222 is ejected using the hot exhaust stream in line 218 to lower the pressure of the cold exhaust stream at the vortex tube 208 and cool the hot exhaust stream in line 218. Note that while the ejector 220 is shown and preferred, any kind of mixing device could be used. A mixed cold and hot exhaust stream exiting the ejector 220 in line 212 comprises the cooling medium for the low pressure partial condenser 202 as mentioned above.

The recirculation flow in the vortex tube 208 is cooled by both the gas cooled vortex tube heat exchanger 104 and the liquid cooled vortex tube heat exchanger 206. The liquid cooled exchanger 206 is also preferably integrated into the vortex tube wall at a warming section 224 wherein the recirculation flow gets progressively warmer than the feed temperature. The combined liquid stream cooling medium in line 216 should not contain an excessive amount of volatile components which could be re-vaporized by heat exchange in the liquid cooled vortex tube heat exchanger 206. A substantially liquid stream is removed from the liquid cooled vortex exchanger 206 through line 226 for storage, further processing, fuel use, etc. The mixed stream cooling medium is removed from the low pressure partial condenser 202 through line 228 and fed to the gas cooled vortex tube heat exchanger 104 to provide cooling. The mixed stream cooling medium is then fed to the high pressure partial condenser 12 through line 230 as cooling medium and afterwards removed through line 232.

Figure 5:
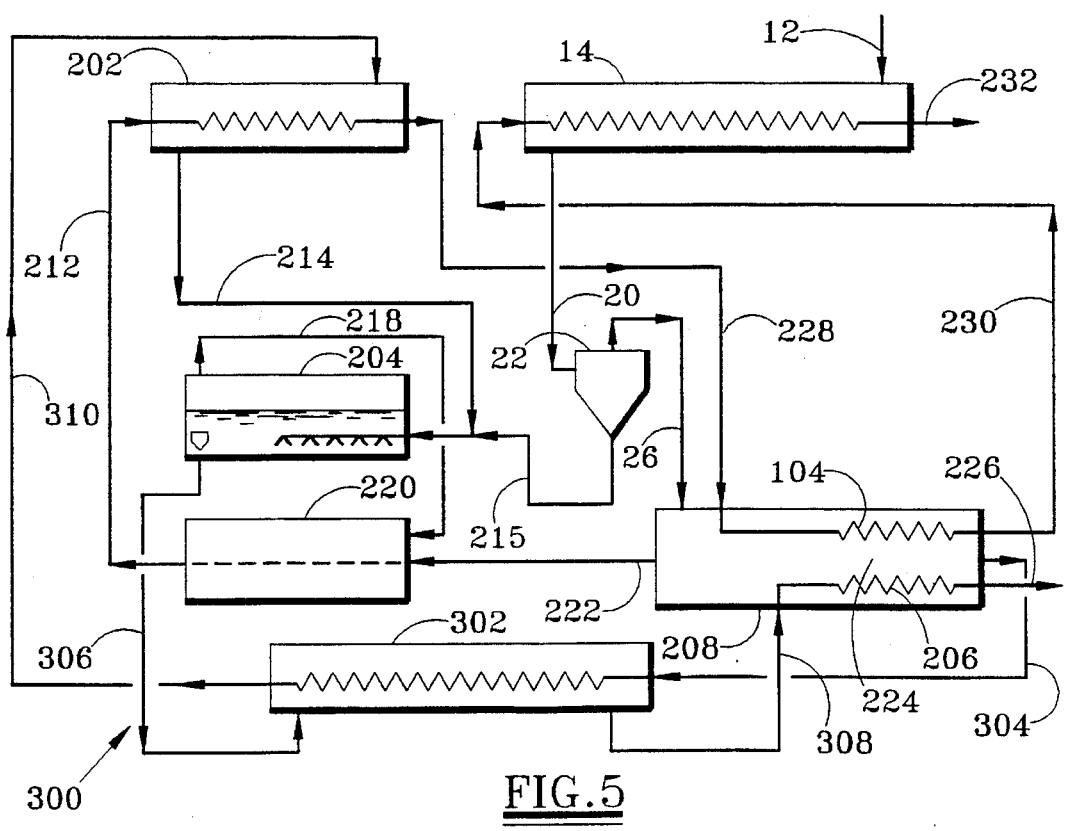
FIG. 5 is a further embodiment of the process of FIG. 4 showing a liquid cooled precooler for the hot exhaust stream prior to the low pressure partial condenser using the liquid stream as cooling medium.

In an alternative arrangement 300 of the present process as seen in FIG. 5, a liquid cooled precooler 302 is disposed upstream of the low pressure partial condenser 202 to precool the hot exhaust stream from the vortex tube 208. In the liquid cooled precooler 302, the hot exhaust stream fed through line 304 is precooled by an exchange of heat with the combined liquid stream from the low pressure separator 204. The combined liquid stream cooling medium as shown in FIG. 5 is fed sequentially first to the liquid cooled precooler 302 through line 306 and then to the liquid cooled vortex exchanger through line 308. However, this arrangement could be reversed or made parallel depending on practitioner preference and the need to minimize pressure losses and obtain the greatest temperature approach possible across the heat exchangers used. The hot exhaust stream is fed from the liquid cooled precooler 302 to the low pressure partial condenser 202 through line 310.

Figure 6:
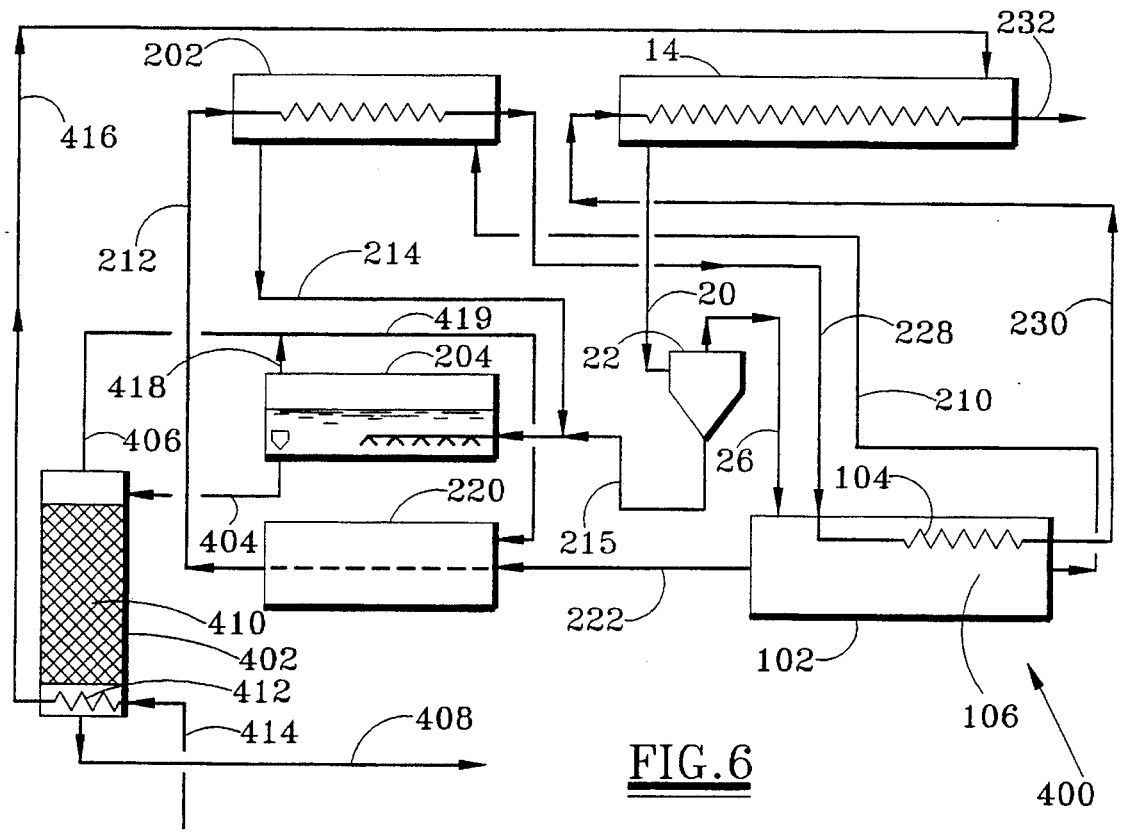
FIG. 6 is another embodiment of the process of FIG. 4 showing a volatiles stripping column for stripping any volatile components from the condensate produced by the partial condensers, wherein the feed gas is heating medium for the reboiler duty and the liquid cooled vortex tube heat exchanger is eliminated.

If the condensate cooling medium contains volatile components much if not all such components can become re-vaporized in the heat exchange steps described above. In such circumstances it is preferred to recover the volatile components by using a stripper or fractionation column having a reboiler either external to or integral with the column base. As seen in FIG. 6, an alternative arrangement 400 of the present process uses a conventional stripping column 402 to strip any volatile components from the combined liquid stream in the low pressure separator 204. The combined liquid stream is withdrawn from the low pressure separator 204 through line 404 and directed to a top section of the stripping column 402 to strip the volatile components and stabilize the liquid stream as is known in the art. The stripper 402 has an overhead line 406 for removing a vapor stream rich in condensable components and a bottoms line 408 for removing a liquid stream lean in condensable components. The stripper also has suitable vapor-liquid contacting elements or trays 410 and a reboiler 412 for providing reflux vapor. The raw feed stream entering the process 400 through line 414 can be used as a heating medium for the reboiler 412. The raw feed stream is then fed to the high pressure partial condenser 14 though line 416. The overhead vapor in line 406 can be combined with the uncondensed vapor and gas portion from the hot exhaust stream in line 418 from the low pressure separator 204 and fed through line 419 to the ejector 220. The .lean liquid stream can be optionally fed to the liquid precooler 302 and/or the liquid cooled vortex exchanger 206 where appropriate as a cooling medium which is leaner in condensables thus obviating re-vaporization of any volatile components.

Figure 7:
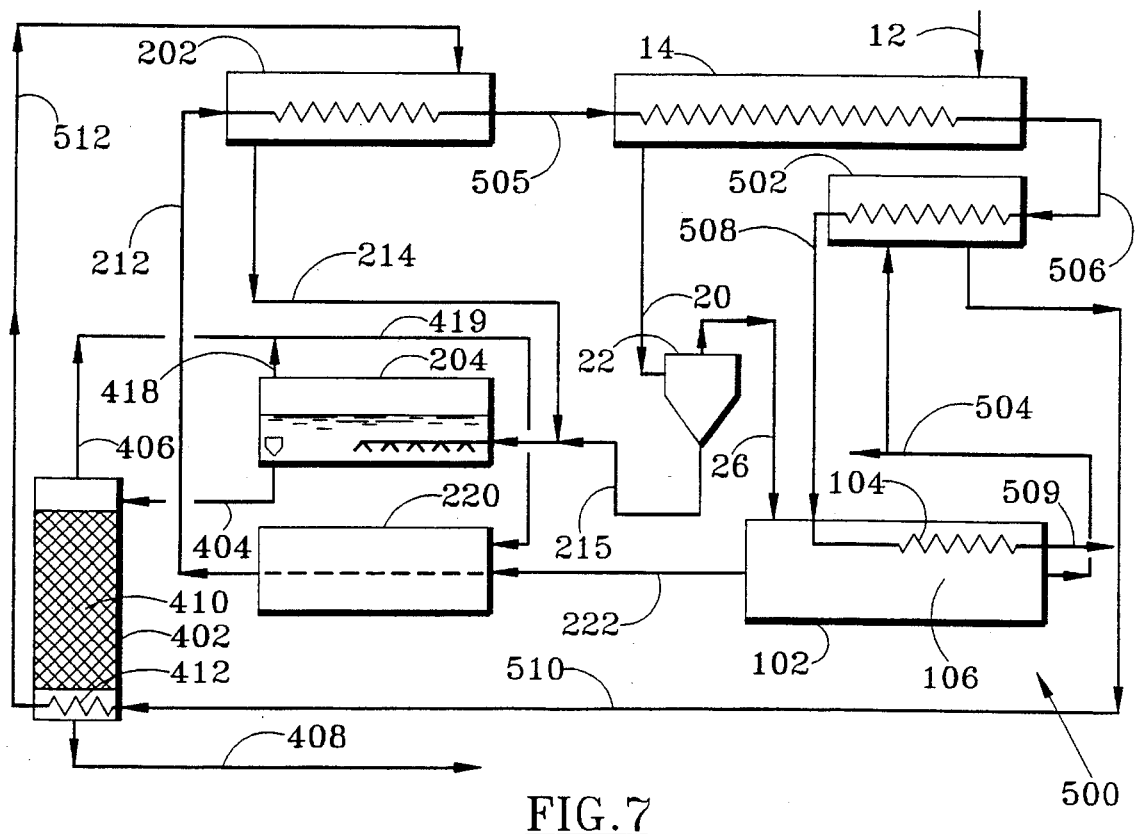
FIG. 7 is another embodiment of the process of FIG. 6 showing a gas cooled precooler for the hot exhaust stream prior to the low pressure partial condenser using the ejector stream as cooling medium, and the precooled hot gas stream as heating medium for the stripping column reboiler duty.

In an alternative arrangement 500 of the present process as seen in FIG. 7, a gas cooled precooler 502 can be used upstream of the low pressure partial condenser 202 to precool the hot exhaust stream. In the gas cooled precooler 502, the hot exhaust stream from the vortex tube 208 in line 504 is precooled by an exchange of heat with a cooling medium fed through line 506 from the high pressure partial condenser 14. The cooling medium in line 506 comprises the mixed stream as described above. In addition, the mixed stream is fed as cooling medium from the low pressure condenser 202 to the high pressure condenser 14 through line 505, from the gas cooled precooler 502 to the gas cooled vortex exchanger 104 through line 510 and is withdrawn from the vortex exchanger 104 through line 509. The hot exhaust stream is fed from the gas cooled precooler 502 to the reboiler 412 through line 508 as heating medium and then to the low pressure condenser 202 through line 512.

It can be seen that the mixed stream from the low pressure separator 204 can be piped as cooling medium to the above described heat exchangers in any order desired. Furthermore, the order can be sequential as shown in FIG. 7, parallel or a combination thereof. However, it is desirable that the exchangers are ordered in a fashion which maximizes the temperature approach across each for enhanced efficiency.

Figure 8:
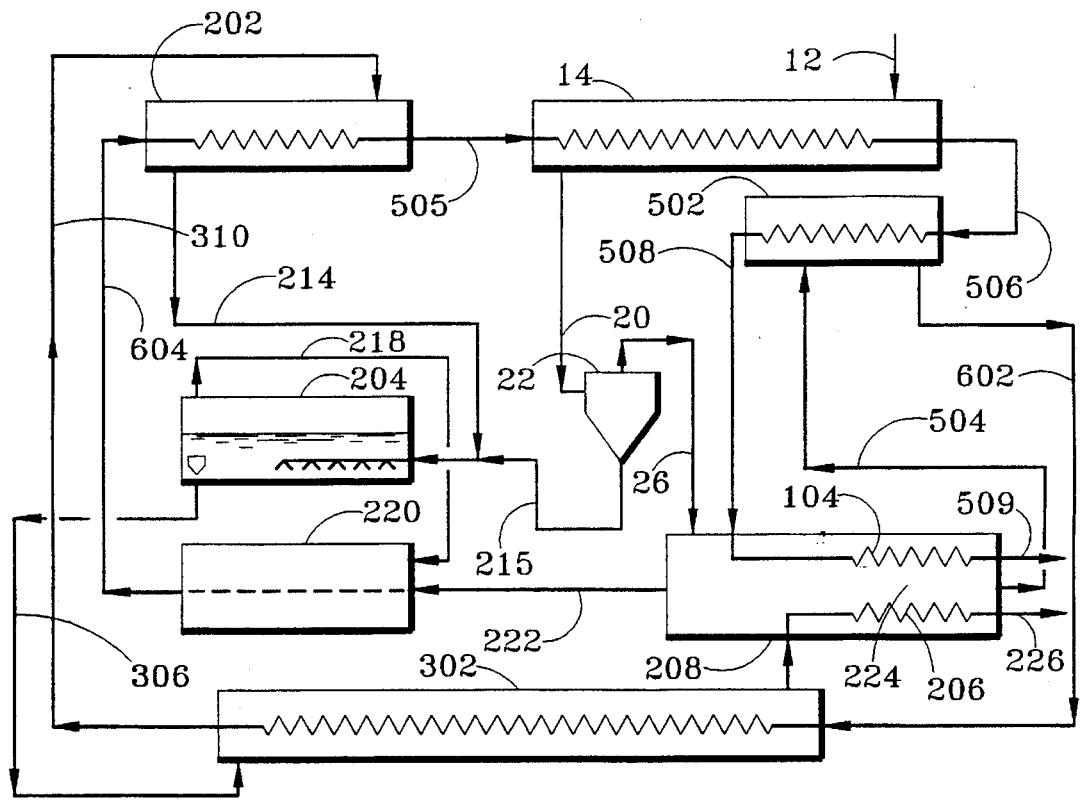
FIG. 8 is another embodiment of the process of FIG. 5 showing a gas cooled precooler for the hot exhaust stream disposed upstream of the liquid cooled precooler wherein the ejector stream is used as cooling medium.

In an alternative arrangement 600 of the present process as seen in FIG. 8, both the liquid cooled and gas cooled precoolers 302, 502 are used in series to precool the hot exhaust stream from the vortex tube 208, wherein the optional stripper column 402 for the liquid cooling medium (as seen in FIGS. 6–7) is not used. While a serial arrangement is shown, it is understood that a parallel arrangement or a combination series and parallel arrangement of the precoolers could be devised. In this case, the hot exhaust stream is fed from the gas cooled precooler 502 to the liquid cooled precooler 302 through a line 602. Following additional precooling, the hot exhaust stream is fed from the liquid cooled precooler 302 to the low pressure partial condenser 202 through line 604.

Figure 9:
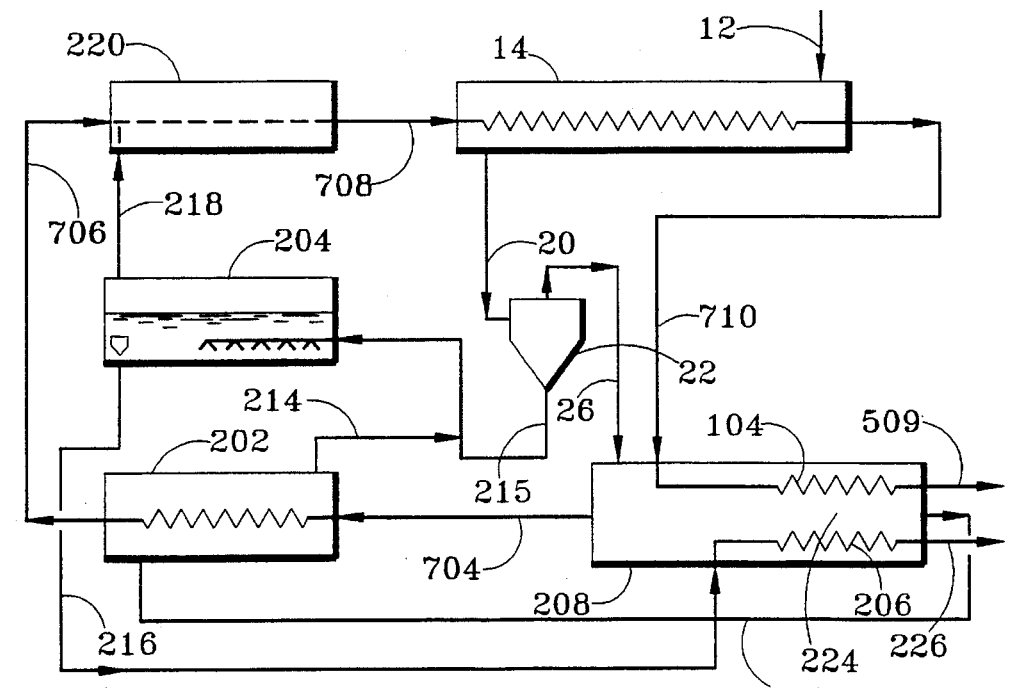
FIG. 9 is another embodiment of the process of FIG. 8 except that both the gas cooled precooler and the liquid cooled precooler are removed and the cooling medium in the low pressure partial condenser is the cold exhaust stream instead of the ejector stream.

In an alternative arrangement 700 of the present process as seen in FIG. 9, stream position of the low pressure partial condenser 202 and the ejector 220 are reversed. Also, the liquid cooled precooler 302, gas cooled precooler 502 and the stripper column 402 are not shown. The location of the ejector 220 with respect to the low pressure condenser 202 is immaterial to the overall thermodynamic outcome provided that the condenser 202 is properly sized. In this arrangement, the hot exhaust stream is fed from the vortex tube 208 to the low pressure partial condenser 202 through line 702. In the low pressure partial condenser 202, the hot exhaust stream is cooled by an exchange of heat with the cold exhaust stream in line 704 as cooling medium instead of the mixed stream cooling medium. The cold exhaust stream cooling medium is fed to the ejector 220 through line 706 wherein the cold exhaust stream is ejected using the uncondensed vapor and gas portion of the hot exhaust stream from the low pressure separator 204 as mentioned previously. The mixed stream from the ejector 220 is fed as cooling medium first to the high pressure partial condenser 14 through line 708 and then to the vortex exchanger 104 through line 710.

The preferred cooling path for the mixed stream medium is one which maximizes cooling potential, which depends on whether the outlet stream temperature in lines 232 or 509 is likely to be lower than the raw feed steam temperature in line 12 or 414. At low to moderate pressures, where the JT cooling effect is usually small, the final exhaust temperature which occurs following significant condensation is likely to be higher than the raw feed stream temperature, in which case the cooling paths shown where stream 509 is the final outlet stream will very likely be preferred, as seen in FIGS. 7, 8 and 9. At very high feed stream pressures or relatively low feed stream temperatures, where the JT cooling effect can be very large, the final outlet temperature which occurs following significant condensation can be lower than the raw feed stream temperature. In this event the preferred cooling paths for will be those where the final outlet stream is stream 232, as seen in FIGS. 4, 5 and 6.

In the manner of the present process, depending upon the thermal effectiveness of each heat exchanger, the residual vapor contained in the hot exhaust stream originating from the vortex tube can ultimately be condensed at a temperature approaching that of the cold exhaust stream issuing from the vortex tube. Moreover, as the hot exhaust stream issuing from the vortex tube is at a substantially greater pressure than that of the cold stream, the fraction of the uncondensed vapor that finally remains at the process exit (e.g. streams 232 or 509) can be as low as or even less than that remaining in the cold exhaust stream.

The present vapor extraction process can be used for most raw gas mixtures having a range of low and higher boiling components. The present invention, however, finds great utility for extracting higher boiling hydrocarbons such as $C_{2+}$ from methane in natural gas produced from a gas and/or petroleum field at an elevated pressure. The present process can also be used for extracting acid gases such as $NO_2$ and $SO_2$ from combustion product gases such as $CO$, $CO_2$, $O_2$, $N_2$ and the like in exhaust streams from furnaces, ore roasting units, flare gas streams, and the like wherein the raw gas stream has an elevated pressure. In general, the present invention can be used to extract a higher boiling component(s) and/or higher molecular weight components from a pressurized mixed gas stream. However, it is generally necessary for the raw gas to initially treated for removal of potentially high freezing components such as water and in some circumstances carbon dioxide, and the like.

It is understood that the above described serial heat exchange steps could also be arranged in parallel or a combination of series and parallel wherein the exhaust stream flows are subdivided. Countercurrent heat exchange flows are preferred but cocurrent flows could be used. The heat exchange steps are set forth to obtain maximum cooling potential from the vortex tube expansion. Therefore, it is desirable that the flows through the exchangers be matched to maximize temperature approach across the exchanger for maximum heat exchange efficiency.

Useful heat exchange equipment in the present process generally have a thermal effectiveness coefficient of at least about 0.4 but preferably from about 0.6 to about 0.95 or more. Among well known heat exchanger designs, shell/tube, plate/fin and other high performance exchangers as described by Usher et al. are suitable. Plate/fin and similar high performance exchangers, however, are preferred for more difficult extractions (i.e. for raw feed streams having leaner concentrations of condensable components and where temperature approaches required are close). Plate and fin exchanger equipment can be designed with thermal effectiveness coefficients of 0.95 or higher. Lower thermal efficiency heat exchangers (e.g. 0.4–0.5) could be selectively employed in some circumstances, with satisfactory though less efficient results obtained. Although shown as separate units, heat exchange equipment in the present invention can be integrated into a compact unit as known in the art to minimize pressure losses and maximize heat transfer efficiency while minimizing cooling losses.

A cyclone, filter or other similar agglomerative vapor-liquid separation device is preferably used between successive hot exhaust stream heat exchange steps to remove any condensate formed in the prior heat exchanger. In such manner, recovery of liquids can be maximized by ensuring greater heat exchanger efficiency. Liquid concentration in a hot exhaust inlet stream can reduce heat transfer coefficients.

An ejector is a preferred means for mixing the cold and hot exhaust streams to increase the pressure ratio across the vortex tube. However, any suitable mixing means known in the art could be employed instead.

Exemplary vortex tube design is described in Fulton and is commercially available, for example, from Vortec Corporation of Cincinatti, Ohio. The vortex tube preferably comprises one or more feed nozzles, a cold and hot exhaust stream port and is fabricated from abrasion resistance materials having low thermal conductivity. The vortex tube external surface, but preferably the external surface of the warming section 224 of the tube 208 is either extended, finned, ribbed, dimpled, or a combination thereof, and the like fabrications to increase a heat transfer area of the hot tube surface to promote efficient heat exchange of the recirculation flow in the vortex tube.

The vortex tube can have radial grooves (not shown) formed in the inside surface towards the warming end as typified in Fekete '494 which is hereby incorporated herein by reference. The radial grooves in the warming section are typically placed up to about 10 tube inside diameters from the tangential feed nozzle, but preferably from about 5 to about 10 inside diameters from the tangential feed nozzle to draw off liquids formed in the vortex tube. Such liquid can form a peripheral boundary layer on the vortex tube inside wall and inhibit heat transfer. Any liquid removed in vortex tube groove(s) can be fed to the low pressure separator 204, for example. The vortex tube can also have an annular slot (not shown) surrounding the orifice and associated ducts through which liquids formed in the core flow in close proximity to the feed nozzle inlet plane can be drawn off. Otherwise, the core liquids which do not get conveyed to the hot end can exit through the cold end with the cold exhaust stream. This circumstance can occur under conditions when the initial vapor content in the raw feed gas is relatively high or when the gas pressure is so high that contribution to gas cooling by the JT effect is significant.

In the practice of the present process in some circumstances, it can be advantageous to operate a cascaded or tandem arrangement of two or more of the aforementioned systems. This can be the case if there is a substantial reduction in performance for a particular vortex tube design at very high pressure ratios or where it is desired to separate vapors and/or concentrate liquids having differing composition. An an example with a two stage arrangement, the mixed exhaust stream downstream from the ejector 220 can serve as the feed stream to the second stage. The cold exhaust stream from the second stage is then reinjected into the first stage downstream of the ejector where the second stage feed stream was sourced.

In other circumstances, the nature of the condensing vapor can be such that it freezes at the prevailing conditions of temperature and pressure in the partial condensers 14, 202. In such instance, it can be necessary to install twin exchangers and associated separation apparatus in parallel and alternate the flows between the two lines of equipment by using a valve switching setup to establish a freeze-thaw cycle to recover liquids that have frozen.

The present process can be further illustrated by reference to the following examples.

EXAMPLES 1–2

In the following examples; a process scheme similar to that shown in FIG. 8 was constructed employing a vortex tube similar to one described by Fulton. The efficiency of the process using both lower and higher thermal effectiveness rated heat exchangers was compared in terms of percent of the adiabatic temperature drop achieved. The effectiveness rating was determined based on tests with dry air. Both the lower and higher rated exchangers were of the shell and tube type except that the higher thermal coefficient exchangers has greater tube side surface area. The cold exhaust fraction for both examples was 0.7.

The dry raw feed gas condition and composition is given in Table 1. Temperature results following a vortex expansion to 13 kPa(a) are given in Table 2.

TABLE 1

| Gas Composition | Mole % |
|---|---|
| Methane | 87.4 |
| Nitrogen | 0.9 |
| Carbon Dioxide | 3.2 |
| Ethane | 5.6 |
| Propane | 2.2 |
| Butanes plus | 0.7 |

| Stream pressure (kPa(g)) | |
|---|---|
| Feed pressure of the raw gas | 300 |
| Pressure of the cold exhaust at the vortex tube discharge port | 13 |

TABLE 2

| | Example 1 | Example 2 |
|---|---|---|
| Estimated Thermal Effectiveness coefficient[b] | 0.47 | 0.78 |
| Stream Temperature (°C.) | | |
| Raw gas feed at the high pressure partial condenser ($T_f$, stream 12) | 24 | 19 |
| Raw gas feed at vortex tube inlet nozzle ($T_j$, stream 26) | 9 | −13 |
| Cold exhaust at vortex tube cold discharge port ($T_c$, stream 222) | −18 | −38 |
| Mixed stream after the low pressure condenser ($T_m$, stream 505) | −8 | −21[a] |
| Hot exhaust at vortex tube hot discharge port (stream 504) | 33 | 25[a] |
| $\Delta T_{adiabatic}$ | 72[c] | 70[c] |
| $\Delta T_{Joule-Thomson}$ | −1[c] | −1[c] |
| % of Adiabatic temperature drop ($T_f$−$T_c$/$\Delta T_{adiabatic}$) | 57 | 82 |

[a]-estimated
[b]-Based on dry air.
[c]-calculated

Use of heat exchangers with a higher thermal effectiveness coefficient improved the performance of the vortex tube in terms of temperature of the cold exhaust stream. This in turn improved the vapor extraction capability of the process.

Calculations can show that a raw feed stream condenser 14 having a thermal effectiveness coefficient of about 0.95 would give a process temperature drop ($T_f$−$T_c$) which would approach that attainable with an isentropic expansion.

The present vapor extracting process is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

What is claimed is:

1. A process for extracting vapor from a gas stream, comprising the steps of:

partially condensing a raw high pressure gas stream rich in condensable vapor by an exchange of heat with a cooling medium comprising a cold exhaust stream from a vortex tube;

separating condensate from the raw gas stream to produce a raw lean gas stream;

expanding the raw lean gas stream in the vortex tube to produce the cold exhaust stream and a hot exhaust stream; and ejecting the cold exhaust stream with the hot exhaust stream in an ejector to give a mixed vortex tube exhaust stream and increase the pressure differential through the vortex tube.

2. A process for extracting vapor from a gas stream, comprising the steps of:

partially condensing a raw high pressure gas stream rich in condensable vapor by an exchange of heat with a cooling medium comprising a cold exhaust stream from a vortex tube;

separating condensate from the raw gas stream to produce a raw lean gas stream;

expanding the raw lean gas stream in the vortex tube to produce the cold exhaust stream and a hot exhaust stream;

mixing the cold exhaust stream with the hot exhaust stream to give a mixed vortex tube exhaust stream; and cooling a recirculation flow in the vortex tube by an exchange of heat with the cold exhaust stream.

3. The process of claim 1 further comprising the step of cooling a recirculation flow in the vortex tube by an exchange of heat with the cold exhaust stream.

4. The process of claims 2 or 3, further comprising the steps of:

partially condensing the hot exhaust stream by an exchange of heat with the mixed vortex tube exhaust stream;

mixing the partially condensed hot exhaust stream with the condensate separated from the raw feed stream to form a mixed condensate hot exhaust stream; and separating condensate from the mixed condensate hot exhaust stream to form a mixed liquid stream and a lean hot exhaust stream.

5. The process of claim 4, further comprising the steps of:

feeding the mixed liquid stream rich in volatiles to a stripping column prior to the step of liquid cooling the recirculation flow in the vortex tube;

stripping volatiles from the mixed liquid stream to produce a volatiles-rich overhead and a volatiles-lean liquid bottoms;

heating the column by an exchange of heat with the raw high pressure stream prior to the raw stream partial condensing step; and mixing the rich gas overhead with the lean hot exhaust stream.

6. The process of claim 5, further comprising the step of precooling the hot exhaust stream by an exchange of heat with the mixed exhaust stream prior to the hot exhaust stream partial condensing step.

7. The process of claim 6, further comprising the step of further precooling the hot exhaust stream prior to the hot exhaust stream partial condensing step by an exchange of heat with the liquid cooling medium.

8. The process of claim 5, wherein the hot exhaust stream partial condensation step is cooled by an exchange of heat with the cold exhaust stream prior to the cold and hot vortex tube exhaust mixing step.

9. The process of claim 5, wherein the column is heated by an exchange of heat with the hot exhaust stream prior to the hot exhaust stream partial condensing step.

10. The process of claim 4, further comprising the step of further cooling the recirculation flow in the vortex tube by an exchange of heat with a liquid cooling medium comprising the mixed liquid stream, wherein the mixed liquid stream remains substantially liquid.

11. The process of claim 10, further comprising the step of precooling the hot exhaust stream by an exchange of heat with the mixed exhaust stream prior to the hot exhaust stream partial condensing step.

12. The process of claim 11, further comprising the step of further precooling the hot exhaust stream prior to the hot exhaust stream partial condensing step by an exchange of heat with the liquid cooling medium.

13. The process of claim 4, wherein the hot exhaust stream partial condensation step is cooled by an exchange of heat with the cold exhaust stream prior to the cold and hot vortex tube exhaust mixing step.

14. The process of claim 4, wherein the cold exhaust stream comprises 50 percent or more of the raw lean gas stream.

15. The process of claim 4, wherein the cold exhaust stream comprises from about 60 to about 80 percent of the raw lean gas stream.

16. An apparatus for extracting vapor from a gas stream, comprising:
(a) a high pressure partial condenser for condensing condensable vapor from raw high pressure gas stream using a cold exhaust stream as a cooling medium;
(b) a high pressure liquid-gas separator for separating condensate from the raw gas stream;
(c) a vortex tube for expanding a lean raw gas stream from the high pressure separator to produce the cold exhaust stream and a hot exhaust stream; and
(d) an ejector for mixing the hot and cold exhaust streams and increasing the pressure differential through the vortex tube.

17. An apparatus for extracting vapor from a gas stream, comprising:
(a) a high pressure partial condenser for condensing condensable vapor from raw high pressure gas stream using a cold exhaust stream as a cooling medium;
(b) a high pressure liquid-gas separator for separating condensate from the raw gas stream;
(c) a vortex tube for expanding a lean raw gas stream from the high pressure separator to produce the cold exhaust stream and a hot exhaust stream;
(d) a mixer for mixing the hot and cold exhaust streams; and
(e) a first vortex heat exchanger integrally attached at a hot exhaust discharge end of the vortex tube for cooling a recirculation flow in the vortex tube and using the cold exhaust stream as cooling medium.

18. The apparatus of claim 16, further comprising a first vortex heat exchanger integrally attached at a hot exhaust discharge end of the vortex tube for cooling a recirculation flow in the vortex tube and using the cold exhaust stream as cooling medium.

19. The apparatus of claims 17 or 18, further comprising:
(a) a low pressure partial condenser disposed downstream of the vortex tube for partially condensing condensable vapor in the hot exhaust stream having the mixed exhaust stream as cooling medium;
(b) a line from the low pressure partial condenser for mixing the partially condensed hot exhaust stream with the condensate separated from the raw high pressure stream to form a mixed condensate hot exhaust stream; and
(c) a low pressure separator for separating condensate from the condensate-containing hot exhaust stream to form a mixed liquid stream and a lean hot exhaust stream.

20. The apparatus of claim 19, further comprising:
(a) a stripping column disposed upstream of the second vortex exchanger having a reflux reboiler for stripping volatiles from the volatiles-rich mixed liquid stream to produce a volatiles-rich gas overhead stream and a volatiles-lean liquid bottoms stream;
(b) a line from the low pressure liquid-gas separator for directing the volatiles-rich mixed liquid stream to the stripping column;
(c) an overhead line from the stripper for mixing the rich overhead stream with the lean hot exhaust stream from the low pressure liquid-gas separator;
(d) a feed line for directing the raw high pressure gas prior to the raw stream partial condenser as heating medium for the reflux reboiler; and
(e) a bottoms line from the stripper for withdrawing the lean liquid stream.

21. The apparatus of claim 20, further comprising a gas cooled precooler disposed upstream of the low pressure partial condenser for precooling the hot exhaust stream using the mixed exhaust stream as cooling medium.

22. The apparatus of claim 21, further comprising a liquid cooled precooler disposed upstream of the liquid cooled vortex exchanger for precooling the hot exhaust stream.

23. The apparatus of claim 20, wherein the gas cooled precooler is disposed upstream of the mixer or ejector and uses the cold exhaust stream as cooling medium.

24. The apparatus of claim 20, wherein the reboiler is disposed upstream of the high pressure partial condenser and employs the hot exhaust stream as heating medium.

25. The apparatus of claim 19, further comprising a second vortex heat exchanger integrally attached to the hot exhaust discharge end of the vortex tube for cooling the recirculation flow in the vortex tube and having the mixed liquid stream as cooling medium, wherein the mixed liquid stream remains substantially liquid.

26. The apparatus of claim 25, further comprising a gas cooled precooler disposed upstream of the low pressure partial condenser for precooling the hot exhaust stream using the mixed exhaust stream as cooling medium.

27. The apparatus of claim 26, further comprising a liquid cooled precooler disposed upstream of the liquid cooled vortex exchanger for precooling the hot exhaust stream.

28. The apparatus of claim 19, wherein the gas cooled precooler is disposed upstream of the mixer or ejector and uses the cold exhaust stream as cooling medium.

29. The apparatus of claim 19, wherein the cold exhaust stream comprises 50 percent or more of the raw lean gas stream.

30. The apparatus of claim 19, wherein the cold exhaust stream comprises from about 60 to about 80 percent of the raw lean gas stream.

* * * * *

UNITED STATES PATENT AND TRADEMARK OFFICE
CERTIFICATE OF CORRECTION

PATENT NO. : 5,483,801
DATED : January 16, 1996
INVENTOR(S) : David J. Craze

It is certified that error appears in the above-indentified patent and that said Letters Patent is hereby corrected as shown below:

Title page, col. 2, line 2,
Delete the reference cited "4,247,794 3/1981 Shirokow et al."
  and insert --4,257,794 3/1981 Shirokov et al.-- in its place.

In column 1, line 4, delete "FILED" and insert --FIELD-- in its place.

In column 10, line 58, delete the word "for".

In column 11, line 18, insert the word --be-- before the word "initially".

In column 12, line 67, delete the units "kPa(a)" and insert -- kPa(g)-- in its place.

Col. 12,
In Table 2, last line, delete the equation "$(T_f-T_c/\Delta DT_{adiabatic})$" and insert --$((T_f-T_c)/\Delta T_{adiabatic})$-- in its place.

In column 13, line 49, delete the equation "$(T_f-T_c)$" and insert --$(T_f-T_c)$-- in its place.

Signed and Sealed this

Second Day of July, 1996

Attest:

BRUCE LEHMAN

*Attesting Officer*   Commissioner of Patents and Trademarks